(12) United States Patent
Wheeler, III (10) Patent No.: US 6,244,646 B1
(45) Date of Patent: Jun. 12, 2001

(54) STORAGE AND RETRIEVAL ASSEMBLY FOR A VEHICLE CARGO AREA

(75) Inventor: Harold William Wheeler, III, Somerset, PA (US)

(73) Assignee: Wheeler Bros., Inc., Somerset, PA (US)

( * ) Notice: Subject to any disclaimer, the term of this patent is extended or adjusted under 35 U.S.C. 154(b) by 0 days.

(21) Appl. No.: 09/455,268

(22) Filed: Dec. 6, 1999

(51) Int. Cl.$^7$ .................................................. B62C 1/06
(52) U.S. Cl. .................................. 296/26.01; 296/26.08; 296/26.09; 414/522
(58) Field of Search ............................. 296/26.08, 26.01, 296/26.09; 414/522; 224/402, 403, 404, 281

(56) References Cited

U.S. PATENT DOCUMENTS

| | | |
|---|---|---|
| 353,640 | 11/1886 | Nourse . |
| 1,285,708 | 11/1918 | Hormes . |
| 2,576,385 | 11/1951 | Bigsby . |
| 2,784,027 | 3/1957 | Temp . |
| 2,852,303 | 9/1958 | Hopson . |
| 3,084,816 * | 4/1963 | Bozio .................................. 414/522 |
| 3,224,805 | 12/1965 | Clyatt . |
| 3,381,835 | 5/1968 | Lee . |
| 3,471,045 | 10/1969 | Panciocco . |
| 3,700,301 | 10/1972 | Boeck . |
| 4,113,293 | 9/1978 | Paquette . |
| 4,216,986 | 8/1980 | McNinch et al. . |
| 4,231,695 | 11/1980 | Weston, Sr. . |
| 4,305,695 | 12/1981 | Zachrich . |
| 4,367,906 | 1/1983 | Röck . |
| 4,375,306 | 3/1983 | Linder . |
| 4,557,531 | 12/1985 | Rö ck et al. . |
| 4,573,731 * | 3/1986 | Knaack et al. ........................ 296/376 |
| 4,685,857 | 8/1987 | Goeser et al. . |
| 4,705,315 | 11/1987 | Cherry . |
| 4,768,298 * | 9/1988 | Polhemus et al. ...................... 40/358 |
| 4,789,195 * | 12/1988 | Fletcher ............................... 296/37.6 |
| 4,824,158 | 4/1989 | Peters et al. . |
| 4,830,242 * | 5/1989 | Painter ............................... 296/26.09 |
| 4,889,377 * | 12/1989 | Hughes ................................ 414/522 |
| 4,907,703 * | 3/1990 | Alger et al. ........................... 211/10 |
| 4,909,558 | 3/1990 | Roshinsky . |
| 4,915,437 | 4/1990 | Cherry . |
| 4,917,430 * | 4/1990 | Lawrence ............................ 296/37.6 |
| 4,950,123 * | 8/1990 | Brockhaus ......................... 296/26.09 |
| 4,969,678 * | 11/1990 | Loisel ................................. 296/24.1 |
| 4,993,088 | 2/1991 | Chudik . |
| 5,064,335 * | 11/1991 | Bergeron et al. .................. 296/26.09 |
| 5,090,335 | 2/1992 | Russell . |
| 5,098,146 | 3/1992 | Albrecht et al. . |
| 5,513,941 * | 5/1996 | Kulas et al. ....................... 296/26.09 |
| 5,544,998 * | 8/1996 | Malinowski ......................... 414/522 |
| 5,564,767 | 10/1996 | Strepek . |
| 5,820,190 * | 10/1998 | Benner .............................. 296/26.09 |
| 5,934,725 * | 8/1999 | Bowers .............................. 296/26.09 |
| 5,944,371 * | 8/1999 | Steiner et al. ..................... 296/26.09 |
| 5,988,722 * | 11/1999 | Parri ................................. 296/26.09 |
| 5,996,868 * | 12/1999 | Paradis ................................. 224/404 |

OTHER PUBLICATIONS

USA, Department of Commerce, Submission No. 376943; Subject: 39—Long–Life Vehicles (LLV) Mail Retrieval System (Sep. 7, 1999).

* cited by examiner

Primary Examiner—Joseph D. Pape
Assistant Examiner—Kiran B. Patel
(74) Attorney, Agent, or Firm—Kirkpatrick & Lockhart LLP (57) ABSTRACT

A storage and retrieval assembly for a vehicle cargo area is disclosed. The storage and retrieval assembly includes a base support structure mounted in the vehicle cargo area, a first tray moveably connected to the base support structure and a second tray attached to the first tray. The attached first and second trays are movable into and out of the vehicle cargo area through an opening thereof. A storage and retrieval system for a vehicle cargo area is also disclosed. The storage and retrieval system may include the described storage and retrieval assembly in combination with a shelf assembly mounted in the vehicle cargo area and/or a shelf mounted on the wheel well of the vehicle in the cargo area.

20 Claims, 11 Drawing Sheets

STORAGE AND RETRIEVAL ASSEMBLY FOR A VEHICLE CARGO AREA

CROSS-REFERENCE TO RELATED APPLICATIONS

Not applicable.

FEDERALLY SPONSORED RESEARCH

Not applicable.

BACKGROUND OF THE INVENTION

1. Field of the Invention

The subject invention relates to storage assemblies and, more particularly, to storage and retrieval assemblies for vehicle cargo areas.

2. Description of the Invention Background

Many types of vehicles include a hauling space or a cargo area. Examples of such vehicles include pickup trucks, vans and an assortment of delivery vehicles, such as, for example, the United States Postal Service's fleet of long-life postal delivery vehicles ("LLV"). When utilizing the hauling capabilities of such vehicles, it is often desirable that a person be able to load and/or unload the cargo from the cargo area while the person remains outside of the vehicle. Typically, there is not room in a loaded cargo area, as is the case with the described LLV, for a person to safely enter the cargo area. In addition, loading and/or unloading from outside the vehicle reduces the possibility of physical injury to the person performing the work.

To assist in the loading and/or unloading of cargo being hauled in the cargo area of such vehicles, such as pickup trucks, it is known to install a storage tray or a cargo box in the cargo area that can be maneuvered into and out of the cargo area, as needed. An example of such an arrangement is disclosed in U.S. Pat. No. 4,824,158. This patent discloses a combination cargo box and bed liner for vehicles wherein the cargo box is mounted for longitudinal movement between a forward position, where the cargo box is positioned inside of the vehicle cargo area, and a rearward access position, where the cargo box extends outwardly from the vehicle cargo area. Such an arrangement does not, however, make effective use of the entire cargo area to maximize the hauling capabilities of a particular vehicle cargo area.

Thus, there is a need for an improved storage and retrieval assembly for a vehicle cargo area.

There is a further need for a storage and retrieval assembly for a vehicle cargo area that makes effective and efficient use of the space available in the vehicle cargo area.

There is still another need for a storage and retrieval assembly for a vehicle cargo area that provides increased storage, hauling capacity and organizational capabilities.

There is yet another need for a storage and retrieval assembly for a vehicle cargo area that can be economically manufactured and easily installed in vehicle cargo areas of an assortment of vehicles.

SUMMARY OF THE INVENTION

The present invention meets the above-identified needs, as well as others, by providing an improved storage and retrieval assembly for a vehicle cargo area. The storage and retrieval assembly includes a base support structure mounted in the vehicle cargo area adjacent a floor surface of the vehicle cargo area. The storage and retrieval assembly also includes a first tray movably connected to the base support structure and a second tray attached to the first tray. Advantageously, the second tray allows for increased hauling capacity and more efficiently utilizes the space available in the vehicle cargo area.

In another embodiment, a storage and retrieval system is provided for a vehicle cargo area which includes the described storage and retrieval assembly comprising the base support structure, the first tray movably connected to the base support structure and the second tray attached to the first tray, in combination with a shelf assembly mounted to the side wall of the vehicle cargo area. Advantageously, the storage and retrieval system by combining the storage and retrieval assembly and the shelf assembly provides increased hauling capacity and more efficient use of the space available in the vehicle cargo area.

Accordingly, it will be appreciated that the present invention provides an improved storage and retrieval assembly for a vehicle cargo area. Those of ordinary skill in the art will readily appreciate, however, that these and other details of the invention will become further apparent from the drawings and descriptions of the invention set forth herein. The drawings and descriptions will be regarded as illustrative in nature and not as restrictive.

BRIEF DESCRIPTION OF THE DRAWINGS

In the accompanying Figures, there are shown embodiments of the invention wherein.

DETAILED DESCRIPTION OF THE INVENTION

Figure 1:
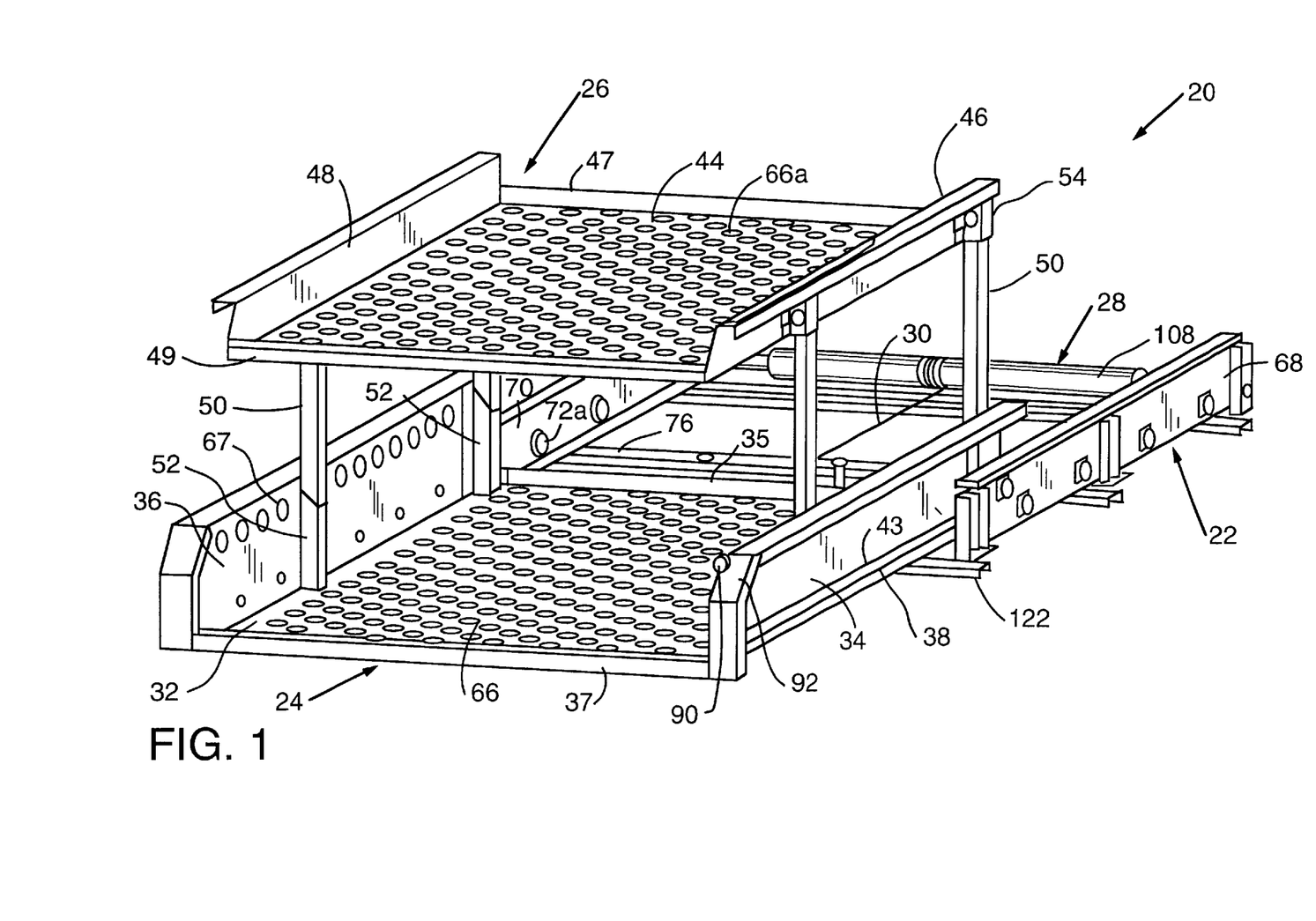
FIG. 1 is an isometric view of a vehicle storage and retrieval assembly in accordance with the present invention.

With reference to FIG. 1, there is shown a storage and retrieval assembly 20 of the present invention. The storage and retrieval assembly 20 is mountable in a vehicle cargo area for movement into and out of the cargo area through an opening thereof, as will be described in more detail herein. The storage and retrieval assembly 20 includes a base support structure 22, a first tray 24 movably connected to the base support structure 22 and a second tray 26 attached to the first tray 24. As can be appreciated, since the second tray 26 is attached to the first tray 24, it is movable along with the first tray 24. The storage and retrieval assembly 20 may also include a counterbalance assembly 28 mounted to the base support structure 22. The counterbalance assembly 28 includes a cable 30 attached to the first tray 24 to provide controlled 10 movement of the first tray 24 and the second tray 26, as will be described in more detail herein.

Figure 2:
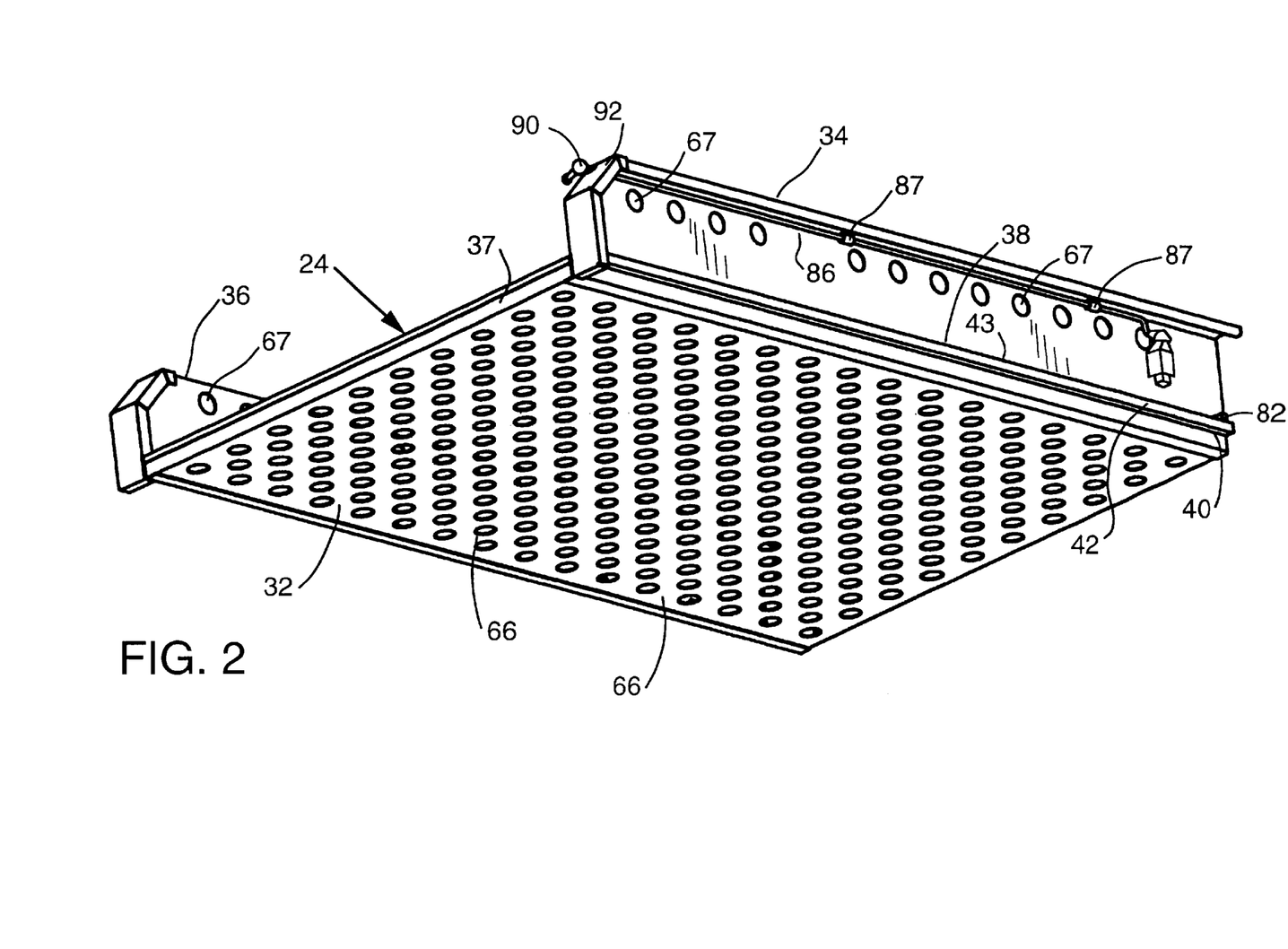
FIG. 2 is a bottom isometric view of a first tray of the storage and retrieval assembly shown in FIG. 1.

Referring to FIGS. 1 and 2, the first tray 24 includes a generally planar bottom wall 32, a first side wall 34 and a second side wall 36. The first tray 24 may also include front wall 35 and rear wall 37. The side walls 34 and 36 extend generally upwardly from the bottom wall 32 and extend generally the length thereof. The first side wall 34 includes a longitudinal guide rail 38 extending generally the length of the first side wall 34. The longitudinal guide rail 38 includes a bottom rail surface 40, a lateral rail surface 42 and a top rail surface 43. The longitudinal guide rail 38, and more specifically the bottom rail surface 40, the lateral rail surface 42 and the top rail surface 43 thereof, cooperate with the base support structure 22, as will be described in more detail herein, to movably connect the first tray 24 to the base support structure 22. The second side wall 36 of the first tray 24 also includes a longitudinal guide rail having a bottom rail surface, a lateral rail surface and a top rail surface (not shown) that are essentially identical to the longitudinal guide rail 38 and the bottom rail surface 40, lateral rail surface 42 and top rail surface 43 thereof. It will be appreciated that the first side wall 34 and the second side wall 36 provide structure for movably attaching the first tray 24 to the base support structure 22, and also provide structure for supporting and/or maintaining cargo items on the first tray 24.

As shown in FIG. 1, the second tray 26 includes a generally planar bottom wall 44, a first side wall 46 and a second side wall 48. The second tray 26 may also include front wall 47 and rear wall 49. The side walls 46 and 48 extend upwardly from and generally perpendicular to the generally planar bottom wall 44 and extend generally the length thereof. The bottom wall 44 is preferably generally parallel to bottom wall 32. It will be appreciated that the side walls 46 and 48 of the second tray 26 provide structure for attaching the second tray 26 to the first tray 24, as will be described herein, and also provide structure for supporting and/or maintaining cargo items on the second tray 26.

Figure 3:
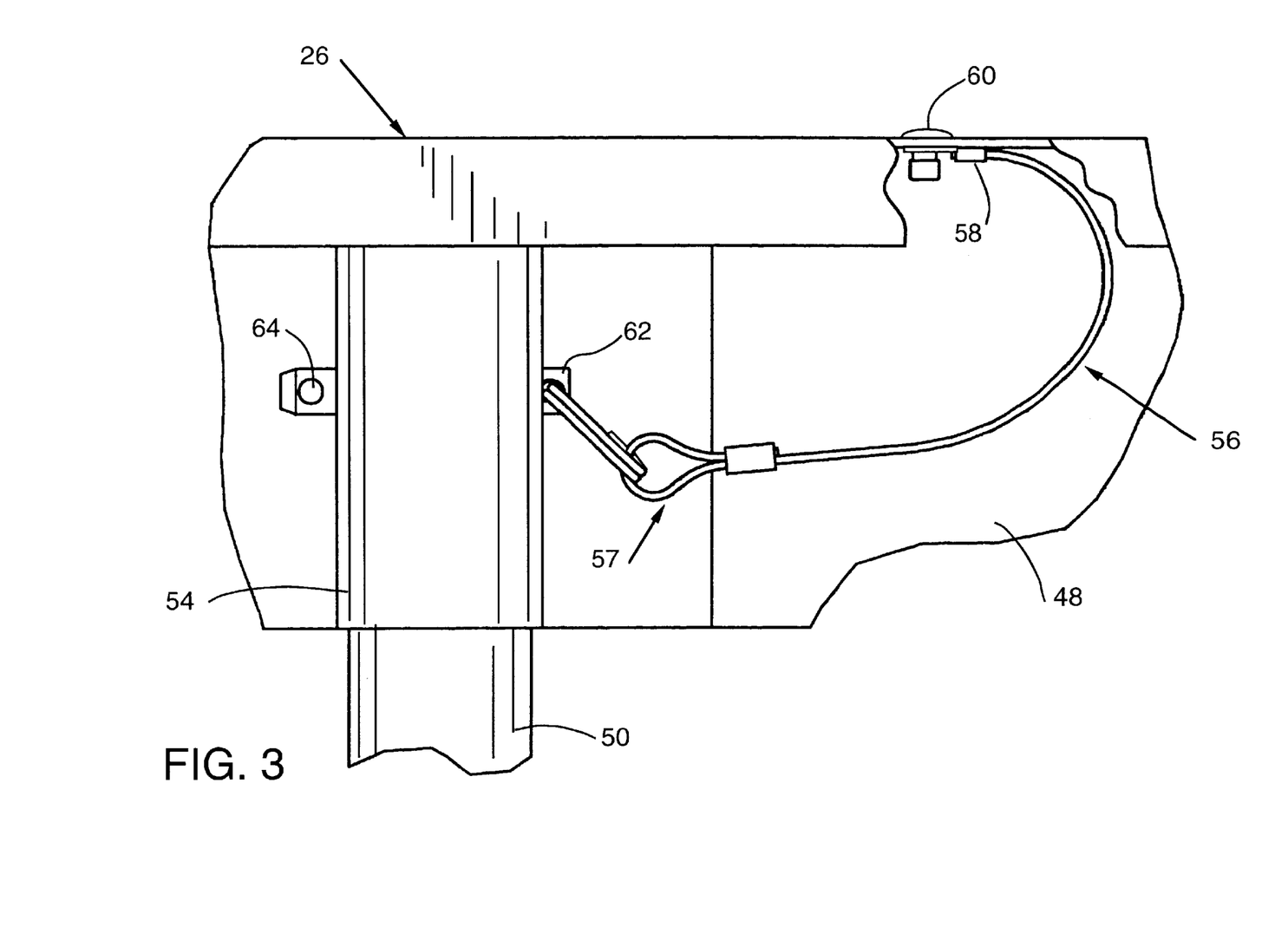
FIG. 3 is a partial side elevational view of a fastener for securing a second tray, of the storage and retrieval assembly shown in FIG. 1, to a leg member.

Referring to FIGS. 1 and 3, the second tray 26 is shown attached to the first tray 24. The attachment is provided by leg members 50 that extend between the first tray 24 and the second tray 26. Specifically, leg receptacles 52 are provided on the first and second side walls 34 and 36 of the first tray 24 for receiving a first end of the leg members 50. The leg members 50 are releasably received in the leg receptacles 52 such that the second tray 26 may be removed from attachment with the first tray 24. The weight distribution of the second tray 26 maintains the leg members 50 in the leg receptacles 52. It will be appreciated, however, that other means may be provided for permanently attaching or releasably attaching the leg members 50 to the first tray 24.

The second tray 26 includes leg receptacles 54 attached to the first and second side walls 46 and 48 for releasably receiving a second end of the leg members 50. As best shown in FIG. 3, a tethered fastener, generally designated by reference number 56, is provided for releasably attaching the leg members 50 to the second tray 26. Specifically, the tethered fastener 56 includes a tethered end 58 affixed to the second tray 26 by, for example, a suitable fastener 60. The tethered fastener 56 also includes a fastener end 57 having a pin 62 that extends through aligned apertures (not shown), in the leg receptacle 54 and the leg member 50. A retaining device, such as a spring loaded detent ball (not shown) or a cotter pin (not shown), may be provided to extend through aperture 64 of the pin 62 to releasably secure the fastener end 57 of the tethered fastener 56. It will be appreciated that by releasably securing the second tray 26 to the leg members 50, the second tray 26 may be easily removed from attachment with the first tray 24. It will also be appreciated that other suitable means may be provided for permanently attaching or releasably attaching the second tray 26 to the leg members 50 in accordance with the invention. It will further be appreciated that the second tray 26 may be attached to the first tray 24 by means other than the leg members 50. For example, the leg members 50 may be eliminated and the second tray 26 could be permanently or releasably attached directly to the side walls 34 and 36 of the first tray 24.

Referring to FIGS. 1 and 2, the first tray 24 is shown as having a plurality of holes 66 extending through the generally planar bottom wall 32 thereof. Similarly, the second tray 26 is shown as having a plurality of holes 66a extending through the generally planar bottom wall 44 thereof. Advantageously, the plurality of holes 66 and 66a allow for the weight of the first and second trays 24 and 26 to be reduced. Such a weight reduction may be important, for example, when a heavy cargo load is being carried by a vehicle of limited weight capacity. In addition, the plurality of holes 66 and 66a in the first tray 24 and the second tray 26 allow for a line of sight through the respective bottom walls 32 and 44 to observe, for example, cargo or other items placed beneath or on the first tray 24 and the second tray 26. A plurality of holes 67 may also be provided on side walls 34 and 36 to, for example, further reduce the weight of the first tray 24 and provide additional lines of sight.

Figure 4:
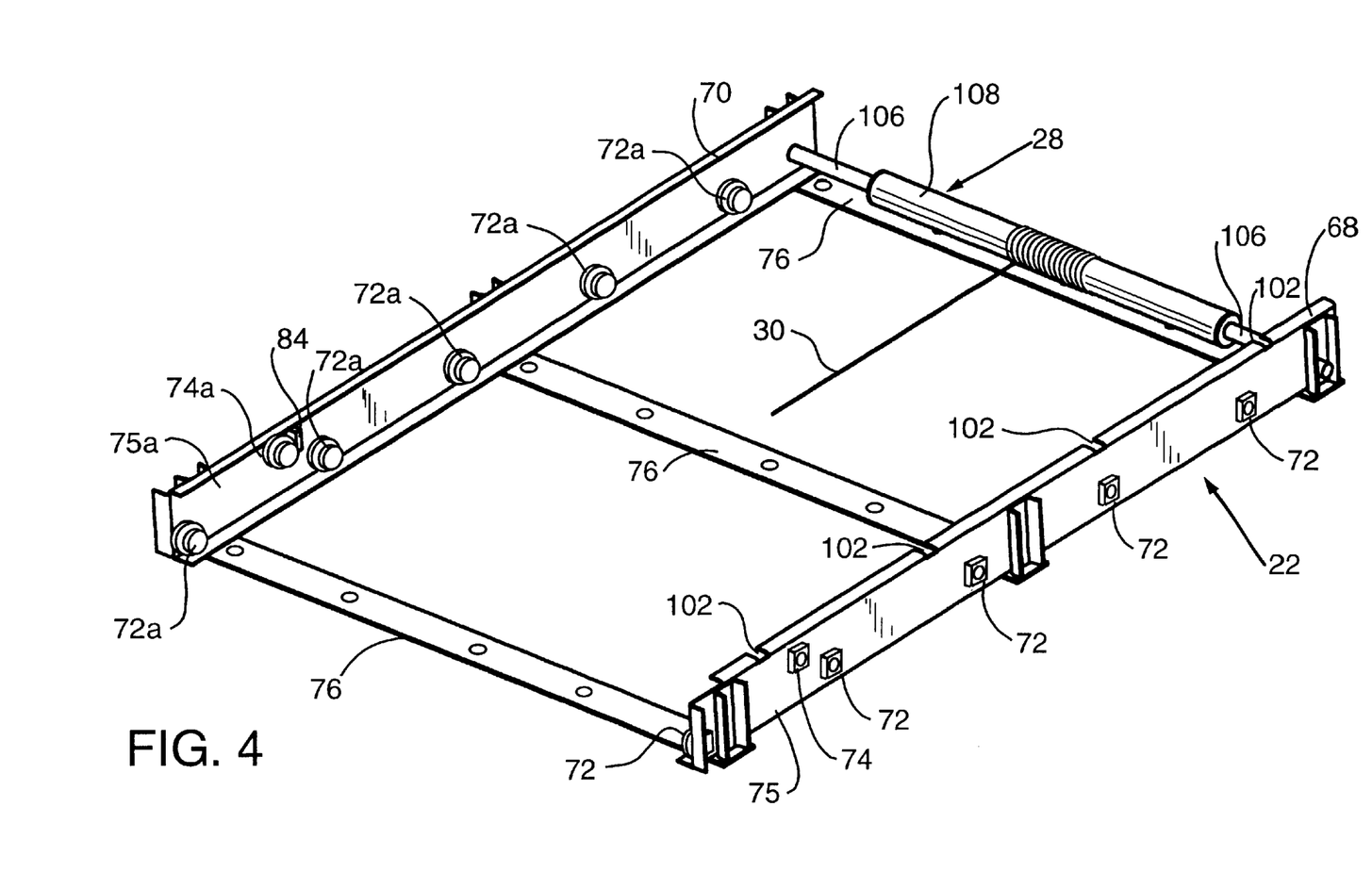
FIG. 4 is an isometric view of a base support structure of the storage and retrieval assembly shown in FIG. 1.

Referring to FIGS. 1 and 4, the base support structure 22 includes a first longitudinal guide member 68 and a second longitudinal guide member 70 spaced laterally from and generally parallel to the first longitudinal guide member 68. The first longitudinal guide member 68 includes a plurality of rollers 72 mounted thereto. The second longitudinal guide member 70 also includes a plurality of rollers 72a mounted thereto. An additional roller 74 is also mounted to the first longitudinal guide member 68 and elevated above the other rollers 72. Similarly, additional roller 74a is mounted to the second longitudinal guide member 70 and elevated above the other rollers 72a. The rollers 74 and 74a are mounted adjacent second or rearward ends 75 and 75a of the first and second longitudinal guide members 68 and 70, respectively. As can be appreciated, the first and second side walls 34 and 36, and specifically the longitudinal guide rails thereof, cooperate with the rollers 72, 72a and rollers 74, 74a to provide the movement of the first tray 24 with respect to the base support structure 22.

Referring to FIG. 4, the base support structure 22 also includes spaced apart cross bars 76 extending between the first and second longitudinal guide members 68 and 70. The cross bars 76 are affixed at ends thereof to the first and second longitudinal guide members 68 and 70 using suitable fasteners (not shown). It will be appreciated that the cross bar 76 provides structural support to the base support structure 22, as well as providing structure for attaching the base support structure to the vehicle cargo area, as will be described in more detail herein.

Figure 5:
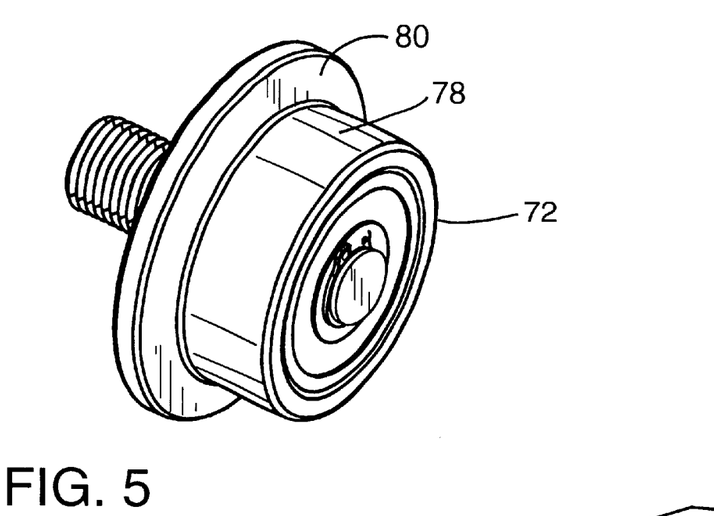
FIG. 5 is an isometric view of a typical roller for use with the storage and retrieval assembly shown in FIG. 1.

With reference to FIG. 5, there is shown a typical roller 72 for use with the invention, such as, for example, a FLR 1½–2 roller available from Osborn Manufacturing of Cleveland, Ohio, wherein the roller may be modified to suit the particular needs of the invention. It will be appreciated that rollers 72, 72a, 74 and 74a are essentially identical to each other. The roller 72 includes a main bearing surface 78 and a chamfered bearing surface 80 adjacent thereto. When the first tray 24 is movably connected to the base support structure 22 by, for example, the longitudinal guide member 38 cooperating with the rollers 72, it will be appreciated that the bottom rail surface 40 of the longitudinal guide rail 38 primarily contacts the main bearing surface 78 of the roller 72 while the lateral rail surface 42 primarily contacts the chamfered bearing surface of the roller 72. Advantageously, the use of roller 72 provides for both vertical and lateral support of the first tray 24 to provide smooth, precise and consistent movement of the tray 24 with respect to the base support structure 22. The bottom rail surface 40 may also contact the chamfered surface 80 with the chamfer then acting as a guide to guide the longitudinal guide rail 38 to where the bottom rail surface 40 primarily contacts surface 78. Of course, it will be appreciated that the longitudinal guide rail of the second side wall 36 of the first tray 24 acts in a similar manner with roller 72a to provide for vertical and lateral support. The top rail surface 43 contacts the main bearing surface 78 of rollers 74 and 74a to provide additional vertical support and prevent upward movement of the first tray 24.

A stop block 82 may be mounted on said longitudinal guide rail 38 (see FIG. 2) adjacent an end of the first tray 24. A similarly positioned stop block may be positioned on the longitudinal guide rail of the second side wall 36 (not shown). An additional stop block 84 (see FIG. 4) may be mounted to the second longitudinal guide member 70 adjacent the roller 74a. Similarly, an additional stop block may be mounted on the first longitudinal guide member 68 adjacent the roller 74 (not shown). Advantageously, the stop blocks, such as stop block 82, mounted on the longitudinal guide rails of the first tray 24 are positioned for engagement with the stop blocks, such as stop block 84, mounted on the longitudinal guide members of the base support structure 22 when the first tray 24 is in the second or rearward position (as shown in FIG. 1) to limit movement of the first tray 24 beyond such rearward position. Furthermore, by positioning the stop blocks 84 adjacent the rollers 74 and 74a, the rollers 74 and 74a do not have to absorb the weight of the first tray when it approaches the rearward position.

Figure 6:
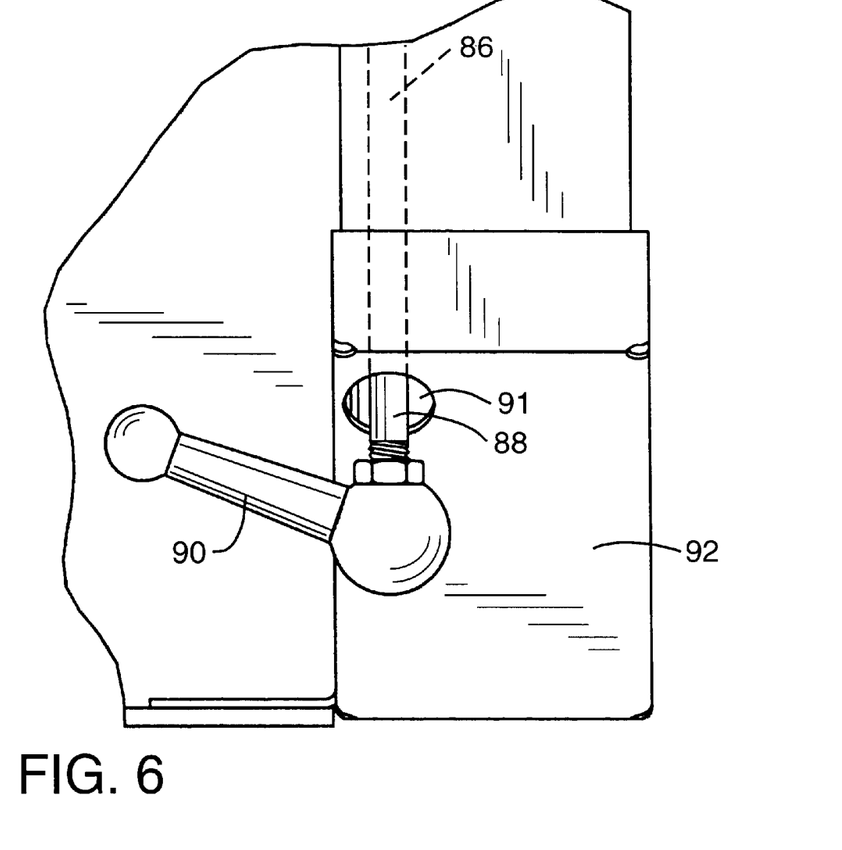
FIG. 6 is a partial top plan view of a handle assembly of the storage and retrieval assembly shown in FIG. 1.
Figure 7:
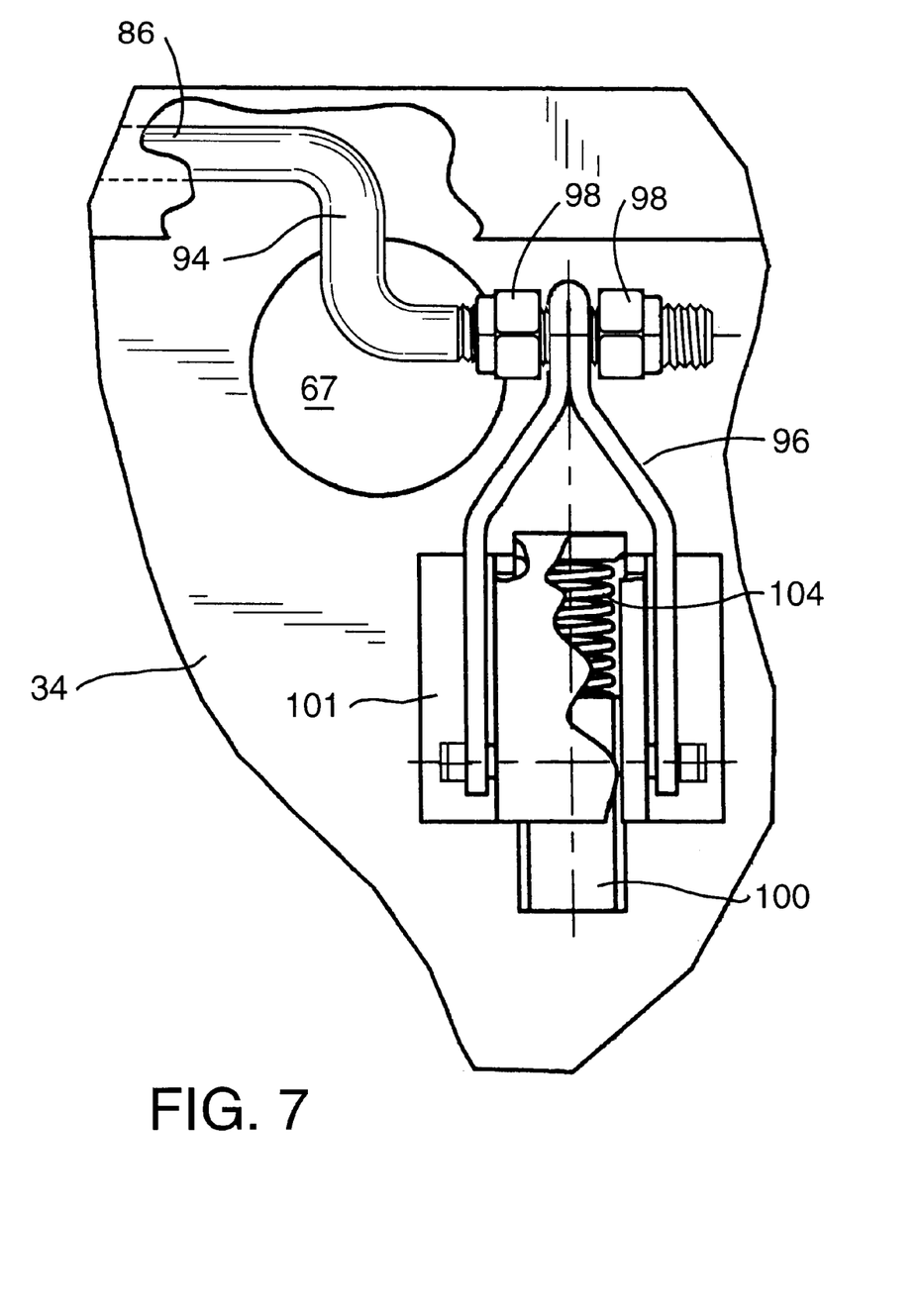
FIG. 7 is a partial side elevational view of a latch assembly of the storage and retrieval assembly shown in FIG. 1.

Referring to FIGS. 2 and 6–7, there is shown a latch assembly for use with the storage and retrieval assembly 20 of the present invention. The latch assembly allows for the first tray 24 to be latched in a desired position, such as a first or forward position, a second or rearward position or various positions therebetween, with respect to the base support structure 22. Specifically, the latch assembly includes a rotatable latch rod 86 attached to the first side wall 34 of the first tray 24 by support brackets 87 which allow the latch rod 86 to remain rotatable. The latch rod 86 includes a handle end 88, adjacent the second or rearward end of the first tray 24, configured for receiving a removably attachable latch rod handle 90. The handle end 88 of the latch rod 86 extends through an aperture 91 defined by a beveled surface 92 formed on the first side wall 34 adjacent the rearward end of the first tray 24.

The latch rod 86 of the latch assembly also includes a crank end 94 pivotally connected to a yoke 96. Support fasteners 98 are attached to the crank end 94 adjacent opposing sides of one end of the yoke 96. Attached to an end of the yoke 96 is a spring biased latch member 100 that is mounted in a housing 101 mounted to the side wall 34. The latch member is operable for receipt in one of a plurality of notches 102 spaced along a top surface of the first longitudinal guide member 68 of the base support structure 22 (see FIG. 4). A compression spring 104 is mounted in the housing 101, for engagement with latch member 100, for biasing the latch member 100 into one of the notches 102 when the latch rod is in the latched position, as shown in FIG. 7. To disengage the latch member 100 from one of the notches 102, the latch rod 86 is rotated such that the crank end 94 thereof causes the yoke 96 to be lifted thus causing the latch member 100 to also be lifted. As long as the latch rod 86 remains in the unlatched position with the latch member 100 being lifted upwardly, the first tray 24 may move freely between the forward and rearward positions. However, rotation of the latch rod 86 to the latched position will result in the latch member 100 being received in the next available notch 102 for securing the first tray 24 in the desired position.

It will be appreciated that the latch assembly may be used as a mechanism for moving the first tray 24 with respect to the base support structure 22. Specifically, a user may rotate the handle 90 to the unlatched position and pull on handle 90 to move the first tray 24 toward the rearward position or push on handle 90 to move the first tray 24 to the forward position. By providing for a releasably attached handle 90, the handle 90 may be replaced following excessive use and wear thereon. In addition, the support fasteners 98 on the crank end 94 of the latch rod 86 contact for the yoke 96 during movement of the first tray 24 to provide support for the yoke 96. Of course, it will be appreciated that the latch assembly may be mounted at other advantageous locations on the assembly 20.

The counterbalance assembly 28, shown in FIGS. 1 and 4, includes the cable 30 attached to the first tray 24 to assist in providing controlled movement of the first tray 24. As will be appreciated, the counterbalance assembly 28 works in cooperation with the latch assembly to provide the controlled movement of the first tray 24. The counterbalance assembly 28 may, for example, be such an assembly available from Vulcan Spring and Manufacturing Co. Of Telford, Pa.

The counterbalance assembly 28 includes a shaft 106 having ends thereof affixed to the first and second longitudinal guide members 68 and 70. It will be appreciated that the counterbalance assembly 28 may be mounted to, for example, the vehicle cargo area, rather than affixing the same to the base support structure 22. The counterbalance assembly 28 also includes a rotatable outer cylinder 108 circumferentially disposed about the shaft 106 for movement with respect thereto. A housing (not shown) may be positioned around the shaft 106 and/or the cylinder 108 to protect the same. Of course, the cable 30 extends through the housing for operation as described herein.

The rotatable cylinder 108 is spring biased to maintain constant tension on the cable 30. Accordingly, when the first tray is being moved and the latch member 100 is not received in one of the notches 102, as described herein, the counterbalance assembly 28, by providing tensioned cable 30 attached to the first tray 24, assists in providing the desired controlled movement of the first tray 24. This is particularly advantageous when, for example, a vehicle containing the storage and retrieval assembly 20 is positioned on an inclined surface and the first tray 24 is being moved with respect to the base support structure 22. The tension on the cable 30 allows for controlled movement of the first tray 24 until such time as the latch member 100 is received in one of the notches 102.

Figure 8:
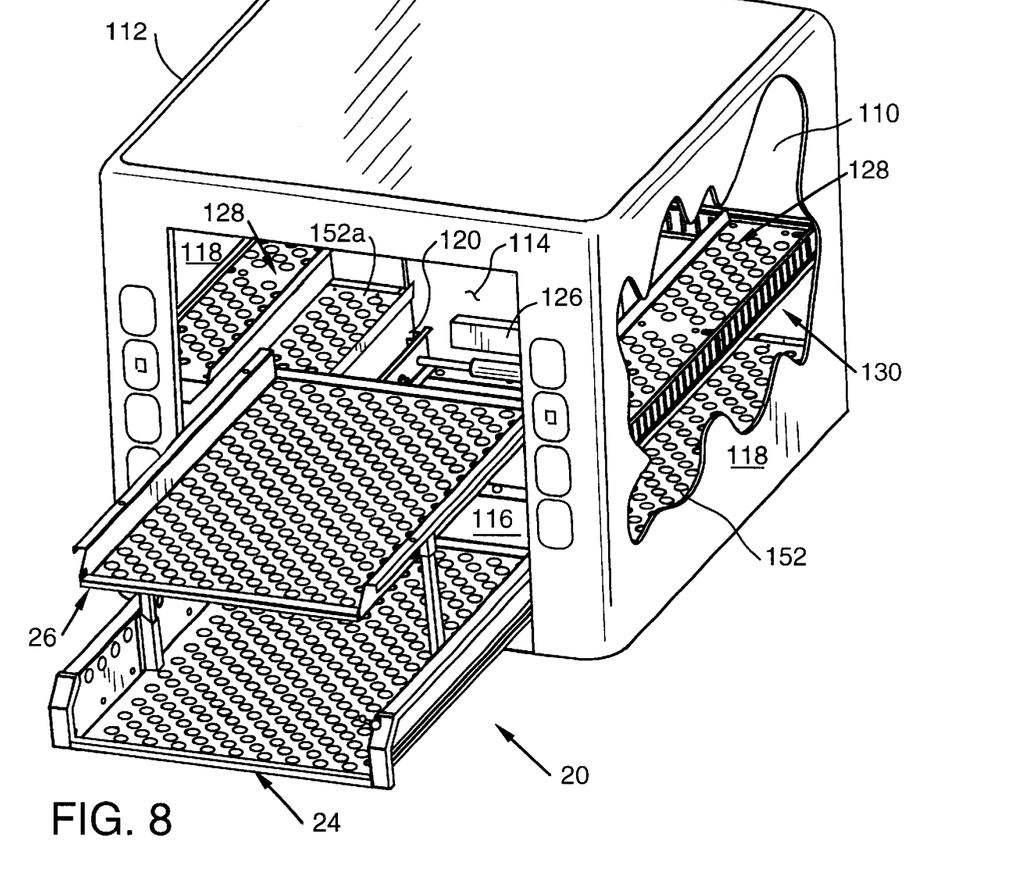
FIG. 8 is a partial isometric view illustrating the storage and retrieval assembly of FIG. 1 as installed in a vehicle cargo area.
Figure 9:
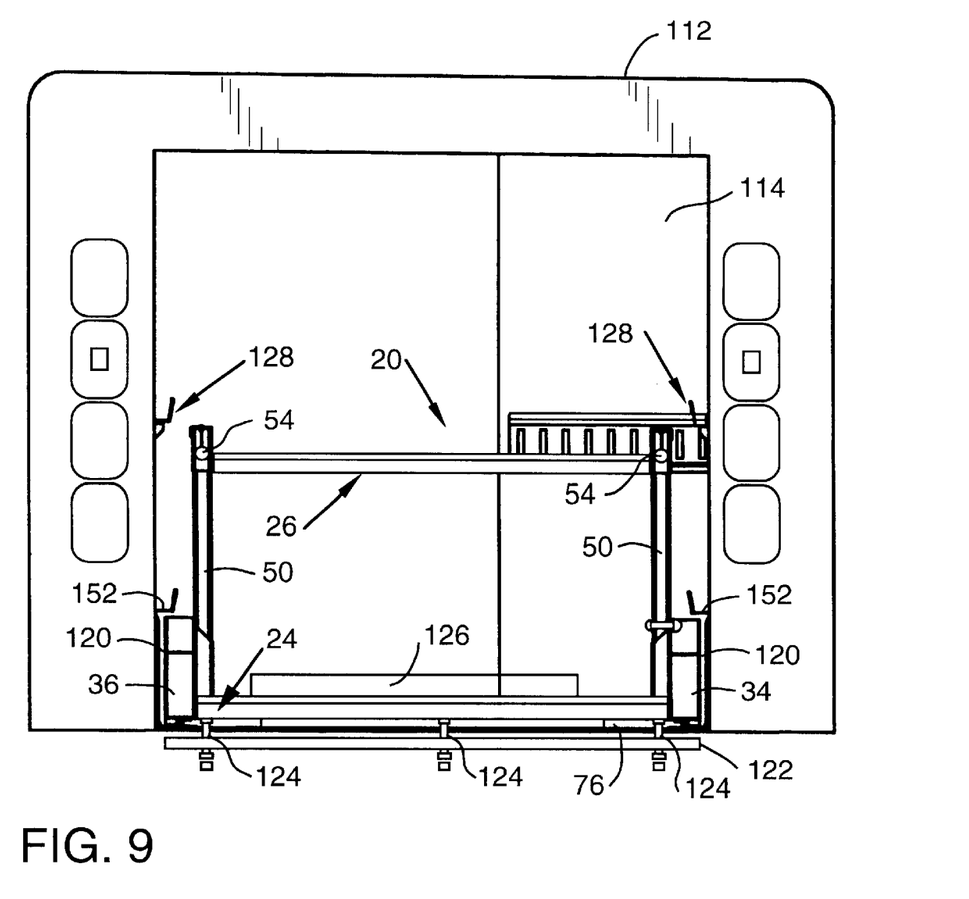
FIG. 9 is an elevational view of FIG. 8 with the storage and retrieval assembly positioned in the vehicle cargo area.

Referring to FIGS. 8 and 9, the storage and retrieval assembly 20 is shown as installed in a cargo area 110 of a vehicle 112, such as, for example, the previously described U.S. Postal Service LLV. The cargo area 110 includes an opening 114, a floor surface 116, side walls 118 and wheel-wells 120. FIG. 8 shows the storage and retrieval assembly 20 extending through the opening 114 with the storage and retrieval assembly 20 in the second or rearward position. FIG. 9 illustrates the storage and retrieval assembly 20 in a first or forward position, wherein the storage and retrieval assembly 20 is contained substantially within the cargo area 110.

Figure 10:
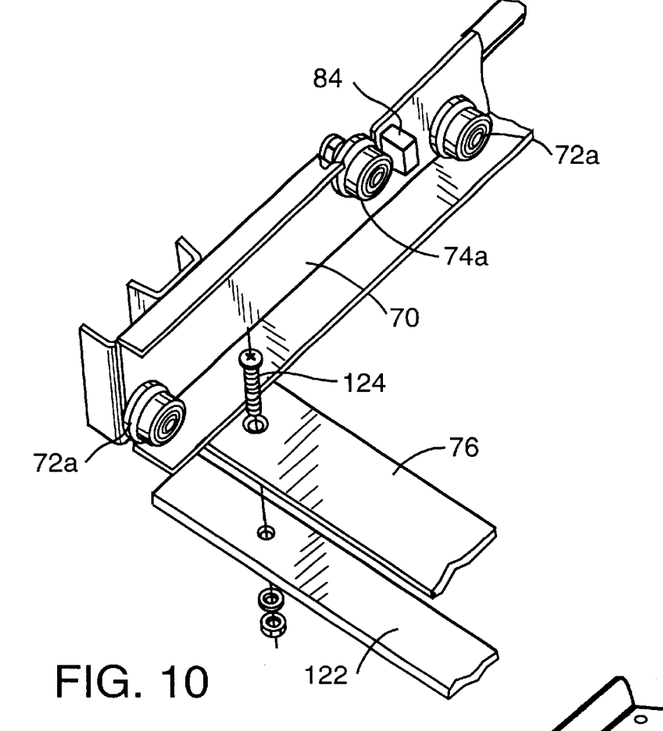
FIG. 10 is a partial isometric view of the base support structure.

With reference to FIGS. 9 and 10, the storage and retrieval assembly 20 is mounted in the cargo area 110 of the vehicle 112 by positioning the base support structure 22 adjacent the floor surface 116 of the cargo area 110. Specifically, the crossbars 76 are positioned adjacent an upper side of the floor surface 116. Spaced apart support bars 122 are positioned adjacent a lower side of the floor surface 116 such that the support bars 122 are generally aligned with the crossbars 76. A plurality of fasteners 124 extend through the crossbars 76, the floor surface 116 and the support bars 122 in order to secure the base support structure 22 to the floor surface 116 of the cargo area 110. It will be appreciated by one of ordinary skill in the art that other similar constructions may be provided for mounting the storage and retrieval assembly 20 in the cargo area 110 and that the description set forth herein is an illustrative example of mounting the storage and retrieval assembly 20 in the cargo area 110.

Referring to FIG. 8, an anti-vibration member 126 may be mounted in the cargo area 110 adjacent the first tray 24 (or adjacent the second tray 26, not shown) such that the first tray 24 will engage the anti-vibration member 126 when in the forward position. It will be appreciated that the engagement between the first tray 24 and the anti-vibration member 126 will reduce vibration and rattling of the storage and retrieval assembly 20. The anti-vibration member 126 may be constructed of, for example, rubber, foam or other suitable material for dampening the vibration or undesired movement of the storage and retrieval assembly 20.

With reference to FIGS. 8 and 11–13, there is shown a shelf assembly, generally designated by reference number 128, for mounting in the cargo area 110. The shelf assembly 128 may be mounted in the cargo area 110 with or without the storage and retrieval assembly 20 also being mounted in the cargo area 110. The shelf assembly 128 includes a support member 130 (such as, for example, an Aluminum Series A-Track FE 725-01 manufactured by Kinedyne Corporation of North Branch, N.J.) that may be attached to the side walls 118 of the cargo area 110. Typically, the support member 130, as illustrated, is an installed feature in the cargo area 110 of the described U.S. Postal Service LLV. The support member 130 includes a first end 132, a second end 134 and an offset central portion 136 therebetween. The offset central portion 136 defines a plurality of elongated slots 138.

Figure 11:
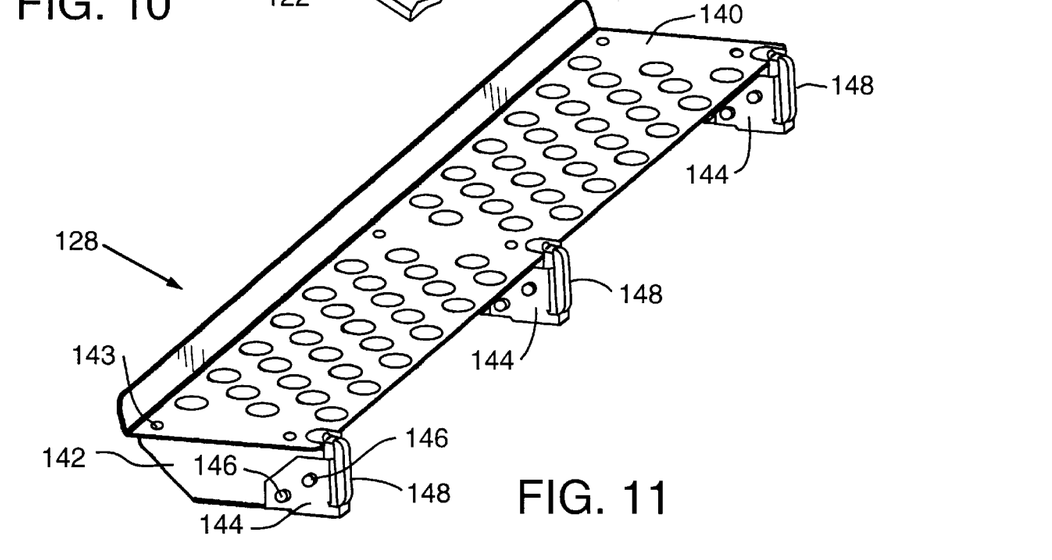
FIG. 11 illustrates a typical shelf assembly for mounting in the vehicle cargo area, as shown in FIG. 8.
Figure 12:
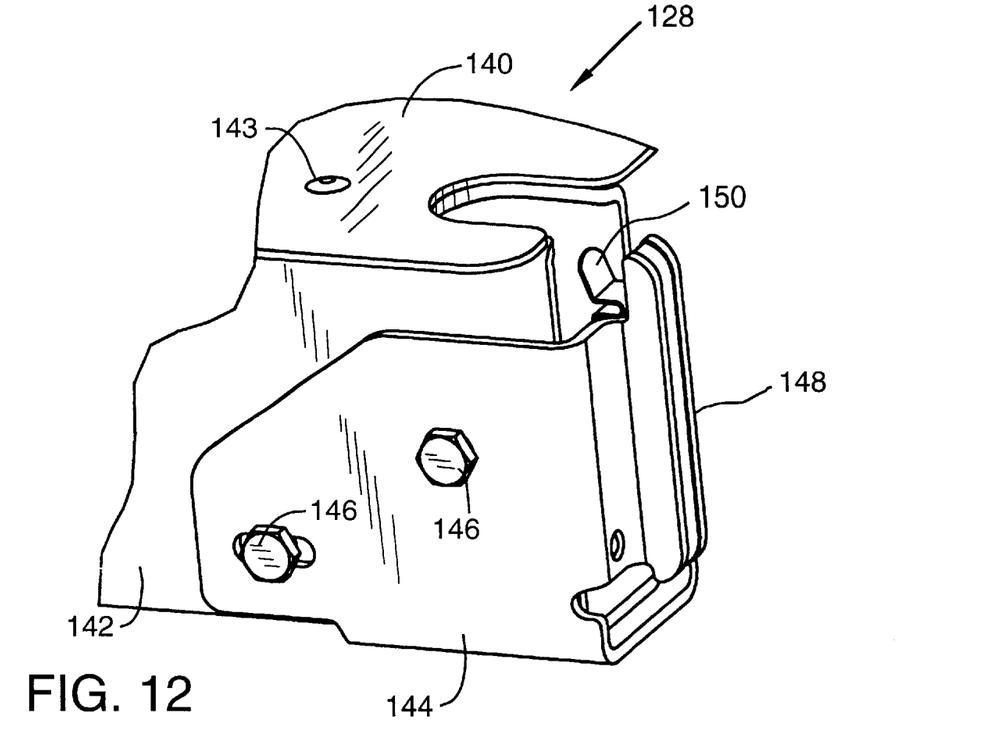
FIG. 12 is a partial isometric view of the shelf assembly shown in FIG. 11.
Figure 13:
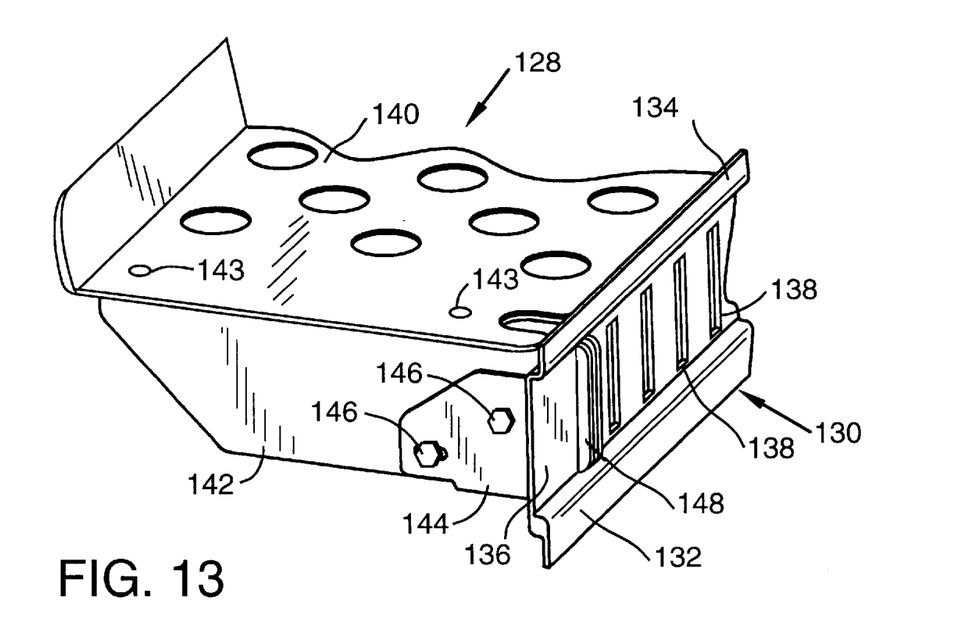
FIG. 13 is another partial isometric view of the shelf assembly shown in FIG. 11.

The shelf assembly 128 also includes a shelf member 140 having support braces 142 attached thereto by, for example, fasteners 143. The support braces 142 extend generally perpendicular to the shelf member 140. A mounting bracket 144 is attached to the support brace 142 of the shelf member 140 for removably attaching the shelf member 140 to the support member 130. Suitable fasteners 146 are provided for attaching the mounting bracket 144 to the support brace 142.

The mounting bracket 144 includes an elongated mounting stab 148 that is received in one of the elongated slots 138 of the support member 130. The mounting bracket 144 also includes a spring clip 150 attached to an end of the mounting stab 148. It will be appreciated that the spring clip 150 is configured for receipt in one of the elongated slots 138 along with the mounting stab 148 so as to bias and maintain the mounting stab 148 in the elongated slot 138. Operation of the spring clip 150 allows for the shelf member 140 to be easily installed and removed from attachment with the support member 130. The mounting bracket 144 is, for example, available from Kinedyne Corporation of North Branch, N.J., as Part No. 43009-2.

Figure 14:
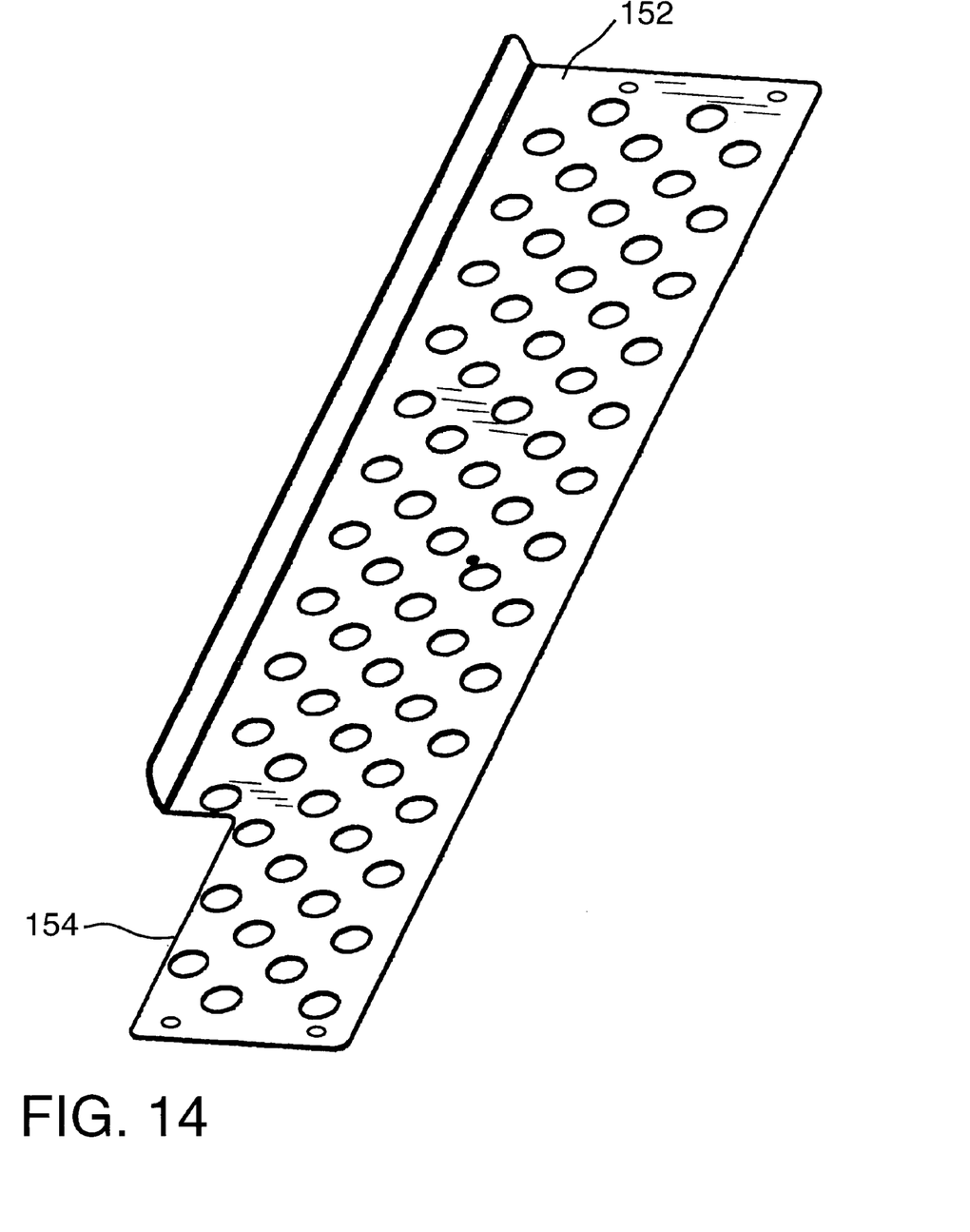
FIG. 14 illustrates an additional shelf for positioning in the vehicle cargo area, as shown in FIG. 8.

Referring to FIG. 14, there are shown additional shelf members 152 and 152a that may also be positioned in the cargo area 110 of the vehicle 112. The shelf members 152 and 152a may be attached, for example, to wheelwells 120 by a suitable fastener. The shelf members 152 and 152a may or may not be installed in combination with the storage and retrieval assembly 20 and/or the shelf assembly 128. The shelf member 152 includes a cutout portion 154 to provide clearance for the first tray 24 to be removably attached to the base support structure 22 (shelf member 152a having a similar cutout portion, not shown)

The storage and retrieval assembly 20, the shelf assembly 128 and the shelf members 152 may be constructed of a lightweight material of suitable strength, such as, for example, steel, aluminum (for example 3000 Series aluminum), a high density polyurethane material, a nylon material or a composite material, for supporting a particular cargo.

Those of ordinary skill in the art will, of course, appreciate that various changes in the details, materials and arrangement of arts which have been herein described and illustrated in order to explain the nature of the invention may be made by the skilled artisan within the principle and scope of the invention as expressed in the appended claims.

What is claimed is:

1. A storage and retrieval assembly for a vehicle cargo area having a floor surface and an opening, the storage and retrieval assembly comprising:
    a base support structure mounted in the vehicle cargo area adjacent the floor surface;
    a first tray movably connected to said base support structure; and
    a second tray attached to said first tray and movable with respect to said base support structure in conjunction with said first tray.

2. The storage and retrieval assembly of claim 1, further comprising at least one leg member extending between said first tray and said second tray, said leg member having a first end secured to said first tray and a second end secured to said second tray.

3. The storage and retrieval assembly of claim 2, wherein said first tray includes at least one leg receptacle, said first end of said at least one leg member releasably received in said at least one leg receptacle.

4. The storage and retrieval assembly of claim 3, wherein said second tray includes at least one leg receptacle, said second end of said at least one leg member releasably received in said at least one leg receptacle of said second tray.

5. The storage and retrieval assembly of claim 4, further comprising a fastener having a fastener end releasably secured to said at least one leg receptacle of said second tray.

6. The storage and retrieval assembly of claim 1, wherein said first tray includes a generally planar bottom wall and said second tray includes a generally planar bottom wall that is generally parallel to said generally planar bottom wall of said first tray.

7. The storage and retrieval assembly of claim 6, wherein said second tray includes a side wall extending upwardly from and generally perpendicular to said generally planar bottom wall of said second tray.

8. The storage and retrieval assembly of claim 6, wherein said generally planar bottom walls of said first tray and said second tray each include a plurality of holes extending therethrough.

9. The storage and retrieval assembly of claim 1, wherein said base support structure includes a first longitudinal guide member having a plurality of rollers mounted thereto, and wherein said first tray includes a first side wall having a first longitudinal guide rail that cooperates with said plurality of rollers.

10. The storage and retrieval assembly of claim 9, wherein said first tray is moveable between a first position where said first tray is positioned substantially in the vehicle cargo area and a second position where said first tray extends through the opening of the vehicle cargo area.

11. The storage and retrieval assembly of claim 10, wherein said first tray includes a first stop block mounted on said first side wall thereof adjacent an end of said first tray, said first longitudinal guide member having a second stop block mounted adjacent an end thereof, said first stop block and said second stop block positioned for engagement when said first tray is in said second position to limit movement of said first tray beyond said second position.

12. The storage and retrieval assembly of claim 9, wherein said base support structure further includes a second longitudinal guide member spaced laterally from and generally parallel to said first longitudinal guide member, said second longitudinal guide member having a plurality of rollers mounted thereto, and wherein said first tray includes a second side wall having a second longitudinal guide rail that cooperates with said plurality of rollers mounted to said second longitudinal guide member.

13. A storage and retrieval assembly for a vehicle cargo area having a floor surface and an opening, the storage and retrieval assembly comprising:

a base support structure mounted in the vehicle cargo area adjacent the floor surface;

a first tray movably connected to said base support structure; and a second tray attached to said first tray, and wherein:

the base support structure includes a first longitudinal guide member having a plurality of rollers mounted thereto and a second longitudinal guide member spaced laterally from and generally parallel to said first longitudinal guide member, said second longitudinal guide member having a plurality of rollers mounted thereto;

said first tray includes a first side wall having a first longitudinal guide rail that cooperates with said plurality of rollers mounted on said first longitudinal guide member and a second side wall having a second longitudinal guide rail that cooperates with said plurality of rollers mounted to said second longitudinal guide member; and said plurality of rollers mounted on said first and second longitudinal guide members each include a main bearing surface and a chamfered bearing surface adjacent said main bearing surface, and wherein said first and second longitudinal guide rails each include a bottom rail surface and a lateral rail surface, said bottom rail surfaces in contact with said main bearing surfaces of said plurality of rollers and said lateral rail surfaces in contact with said chamfered bearing surfaces of said plurality of rollers.

14. A storage and retrieval assembly for a vehicle cargo area having a floor surface and an opening, the storage and retrieval assembly comprising:

a base support structure mounted in the vehicle cargo area adjacent the floor surface;

a first tray movably connected to said base support structure; and a second tray attached to said first tray, and wherein:

said base support structure includes a first longitudinal guide member having a plurality of rollers mounted thereto;

said first tray includes a first side wall having a first longitudinal guide rail that cooperates with said plurality of rollers mounted on said first longitudinal guide member;

said first longitudinal guide member defines a plurality of spaced notches; and further including a latch assembly mounted on said first side wall of said first tray, said latch assembly comprising:

a yoke;

a spring-biased latch member attached to an end of said yoke, said spring-biased latch member receivable in one of said plurality of spaced notches; and a rotatable latch rod having a crank end pivotally connected to another end of said yoke to operate said spring-biased latch member.

15. The storage and retrieval assembly of claim 14, wherein said rotatable latch rod of said latch assembly includes first and second support fasteners attached to said crank end of said rotatable latch rod adjacent opposing sides of said another end of said yoke.

16. The storage and retrieval assembly of claim 14, wherein said latch assembly also includes a latch rod handle removably attached to a handle end of said rotatable latch rod.

17. A storage and retrieval assembly for a vehicle cargo area having a floor surface and an opening, the storage and retrieval assembly comprising:

a base support structure mounted in the vehicle cargo area adjacent the floor surface;

a first tray movably connected to said base support structure;

a second tray attached to said first tray; and a counterbalance assembly comprising:

a shaft rigidly mounted at ends thereof to said base support structure;

a rotatable cylinder circumferentially disposed about said shaft; and a cable wound upon said rotatable cylinder, said cable having a first end attached to said counterbalance assembly and a second end attached to said first tray.

18. The storage and retrieval assembly of claim 17, wherein said rotatable cylinder is spring-biased to maintain tension on said cable.

19. The storage and retrieval assembly of claim 1, wherein said base support structure includes spaced first and second longitudinal guide members and spaced apart cross bars extending therebetween, said cross bars each affixed at ends thereof to said first and second longitudinal guide members.

20. The storage and retrieval assembly of claim 19, wherein said cross bars are positioned adjacent an upper side of the vehicle cargo area floor surface, said base support structure also includes spaced apart support bars positioned adjacent a lower side of the vehicle cargo area floor surface and generally aligned with said cross bars, and a plurality of base fasteners each extending through one of said cross bars, the floor surface of the vehicle cargo area and one of said support bars.

\* \* \* \* \*